US010558391B2

(12) United States Patent
Lee et al.

(10) Patent No.: US 10,558,391 B2
(45) Date of Patent: Feb. 11, 2020

(54) DATA PROCESSING SYSTEM AND DATA PROCESSING METHOD

(71) Applicant: SK hynix Inc., Gyeonggi-do (KR)

(72) Inventors: Kyu-Sun Lee, Gyeonggi-do (KR); Nam-Young Ahn, Gyeonggi-do (KR); Eung-Bo Shim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 216 days.

(21) Appl. No.: 15/606,046

(22) Filed: May 26, 2017

(65) Prior Publication Data

US 2018/0121135 A1    May 3, 2018

(30) Foreign Application Priority Data

Nov. 1, 2016  (KR) .................... 10-2016-0144584

(51) Int. Cl.
*G06F 3/06* (2006.01)
*G06F 16/22* (2019.01)
*G06F 16/2453* (2019.01)

(52) U.S. Cl.
CPC ............ *G06F 3/0659* (2013.01); *G06F 3/064* (2013.01); *G06F 3/0613* (2013.01); *G06F 3/0685* (2013.01); *G06F 16/2282* (2019.01); *G06F 16/24532* (2019.01)

(58) Field of Classification Search
CPC ...... G06F 3/0659; G06F 3/067; G06F 3/0685; G06F 3/064; G06F 3/0613; G06F 16/24532; G06F 16/2282
See application file for complete search history.

(56) References Cited

U.S. PATENT DOCUMENTS

| 2008/0052102 A1* | 2/2008 | Taneja ................. G06Q 10/063 705/7.11 |
| 2013/0227558 A1* | 8/2013 | Du ....................... G06F 9/45558 718/1 |
| 2015/0074672 A1* | 3/2015 | Yeddanapudi .......... H04L 47/11 718/103 |
| 2015/0125133 A1  | 5/2015 | Kim et al. |
| 2015/0150017 A1* | 5/2015 | Hu .......................... G06F 12/00 718/103 |
| 2017/0006135 A1* | 1/2017 | Siebel ..................... H04L 67/02 |

FOREIGN PATENT DOCUMENTS

KR    1020120085400    8/2012

* cited by examiner

*Primary Examiner* — Hiep T Nguyen
(74) *Attorney, Agent, or Firm* — IP & T Group LLP

(57) ABSTRACT

A data processing system includes: a memory device suitable for performing an operation corresponding to a command and outputting a memory data; a data collecting device suitable for collecting big data by integrating the command and the memory data at a predetermined cycle or at every predetermined time, splitting the collected big data based on a predetermined unit, and transferring the split big data; and a data processing device suitable for storing the split big data received from the data collecting device in block-based files in a High-Availability Distributed Object-Oriented Platform (HADOOP) distributed file system (HDFS), classifying the block-based files based on a particular memory command, and processing the block-based files.

24 Claims, 9 Drawing Sheets

DATA PROCESSING SYSTEM AND DATA PROCESSING METHOD

CROSS-REFERENCE TO RELATED APPLICATIONS

The present application claims priority of Korean Patent Application No. 10-2016-0144584, filed on Nov. 1, 2016, which is incorporated herein by reference in its entirety.

BACKGROUND

1. Field

Exemplary embodiments of the present invention relate to a semiconductor designing technology, and more particularly, to a method for parallel processing of large-capacity data outputted from a memory device.

2. Description of the Related Art

For analyzing data between a controller and a memory device, e.g., Dynamic Random Access Memory (DRAM) data between a memory controller and a DRAM device, a typical method in which data are collected for a given time, e.g., for about 100 ms has been used. The method includes using a logic analyzer to collect the data, extracting log files from the collected data, and providing the log files as input data of an analytic software. Then developers check out the results of the analytic software. A disadvantage of this method is that because the logic analyzer has a short data collecting section, the data analysis is fragmentary.

More recently a data recorder has been developed which is capable of collecting data for a maximal data collection section of approximately 30 minutes and collecting data having a file size of about 7.5 TB. However, it takes much time to process the TB-class large-capacity data with existing software tools. Moreover, the software should be capable of analyzing DRAM data for application operations in diverse server/mobile system environments. Therefore, substantial research and development efforts are presently focused in developing new methods which are capable of processing large-capacity data outputted from a memory device more efficiently.

SUMMARY

Embodiments of the present invention are directed to a data processing system capable of parallel processing large-capacity data that are outputted from a memory device based on a High-Availability Distributed Object-Oriented Platform (HADOOP) framework, and a data processing method.

In accordance with an embodiment of the present invention, a data processing system includes: a memory device suitable for performing an operation corresponding to a command and outputting a memory data; a data collecting device suitable for collecting big data by integrating the command and the memory data at a predetermined cycle or at every predetermined time, splitting the collected big data based on a predetermined unit, and transferring the split big data; and a data processing device suitable for storing the split big data received from the data collecting device in block-based files in a High-Availability Distributed Object-Oriented Platform (HADOOP) distributed file system (HDFS), classifying the block-based files based on a particular memory command, and processing the block-based files.

In accordance with another embodiment of the present invention, a data processing method includes: outputting a memory data by performing an operation corresponding to a command; collecting big data by integrating the command and the memory data at a predetermined period or at every predetermined time, and transferring the collected big data by splitting the collected big data into a predetermined unit; and storing the big data in block-based files in a High-Availability Distributed Object-Oriented Platform (HADOOP) distributed file system (HDFS), dividing the stored block-based files by a particular memory command, and processing the divided block-based files.

In accordance with an embodiment of the present invention, a data processing system includes: a memory device suitable for performing an operation corresponding to a command and outputting a memory data; a data collecting device suitable for collecting big data by integrating the command and the memory data at a predetermined cycle or at every predetermined time, and transferring the collected big data by splitting the collected big data into a predetermined unit; and a data processing device suitable for distributively storing the big data transferred from the data collecting device in block-based files, dividing the stored block-based files by a particular memory command, and parallel processing the divided block-based files.

BRIEF DESCRIPTION OF THE DRAWINGS

The above and other features and advantages of the present invention will become more apparent to those skilled in the art to which the present invention pertains by the following detailed description with reference to the attached drawings in which.

DETAILED DESCRIPTION

Figure 1:
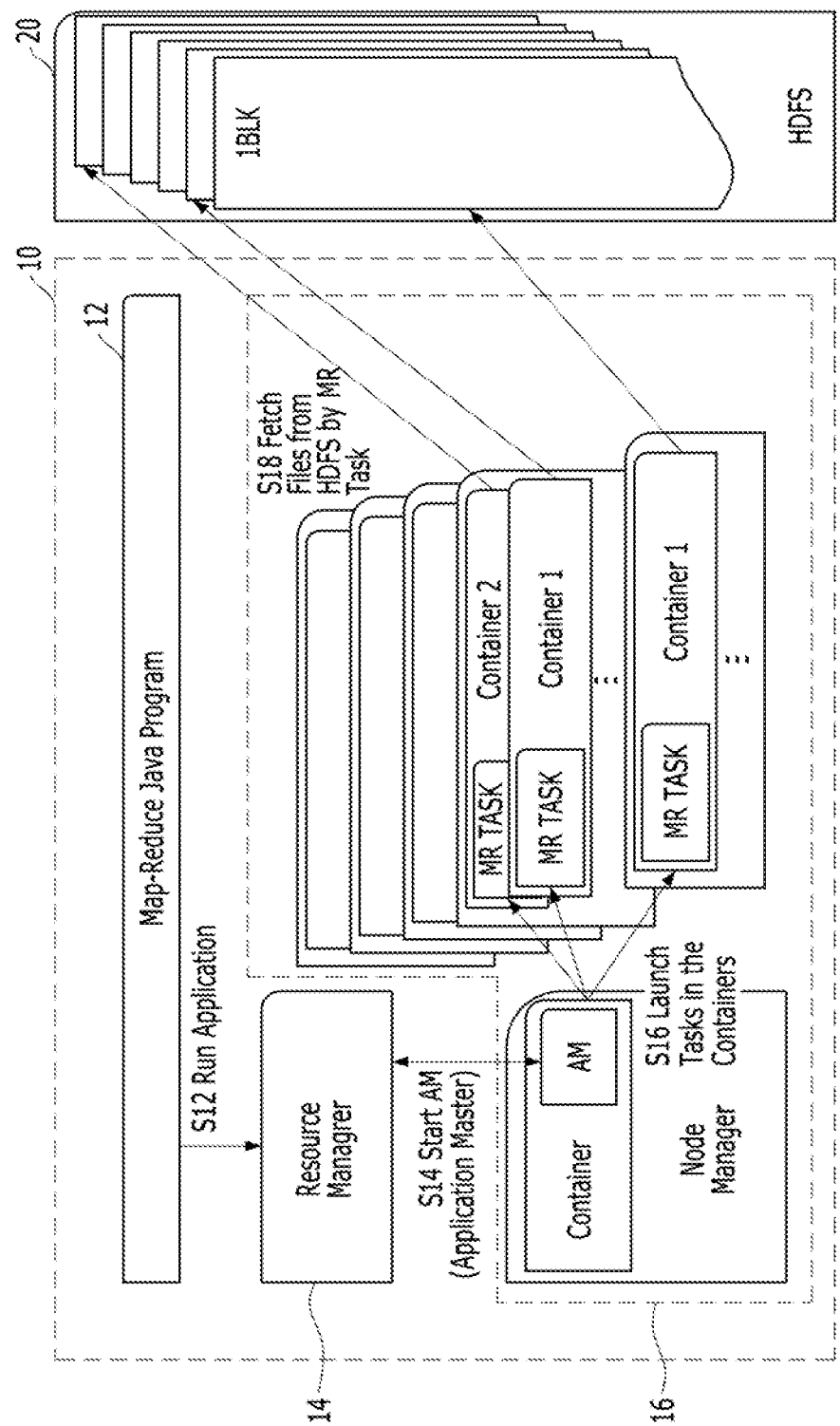
FIG. 1 illustrates an operation flow of a High-Availability Distributed Object-Oriented Platform (HADOOP) framework.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention provides a data processing system capable of parallel processing large-capacity data that are outputted from a memory device based on a High-Availability Distributed Object-Oriented Platform (HADOOP) framework.

The High-Availability Distributed Object-Oriented Platform (HADOOP) is an open-source software framework used for a Java-based distributed storage and processing of large-capacity data, and formed using a motif of a Google File System (GFS) which is developed by Google for operating a cluster server that is grown based on Commodity Hardware.

Since the size of data processed by the HADOOP is generally at least hundreds of gigabytes, data may not be stored in one computer but divided into a plurality of blocks and distributively stored in a plurality of computers. Therefore, the HADOOP may include a HADOOP Distributed File System (HDFS) which distributes input data and stores the distributed data. The distributed data may be processed by a Map-Reduce engine that is developed to process the large-capacity data in parallel in a cluster environment. In other words, the HADOOP may distribute and store the large-capacity data in the HDFS and process the distributed data in parallel by using the Map-Reduce engine. Through such a process, the HADOOP may improve the drawback of a Dynamic Random Access Memory (DRAM) analysis software which is used to analyze large-capacity data that are collected between the DRAM device and a controller having bit-per-second (Bps) traffic of tens of gigabits per second.

An embodiment of the present invention provides a data processing device capable of improving data analyzing time by using the distributed storage and processing technology of the HADOOP and processing large-capacity data through distributed/parallel processing instead of a Single Process Job, when TB-class large-capacity data (Hereinafter, referred to as "big data") outputted from a memory device are analyzed, and a data processing method thereof.

FIG. 1 illustrates an operation flow of a High-Availability Distributed Object-Oriented Platform (HADOOP) framework.

Referring to FIG. 1, a Yet Another Resource Negotiator (YARN) framework, which is a distributed processing framework of the HADOOP, is shown. As described above, the HADOOP may process data in parallel by using a Map-Reduce engine 10 for processing data and a HADOOP distributed file system (HDFS) 20 for storing data.

The HDFS 20 may store data in block-based files. For example, a block may have a size of approximately 64 MByte or 128 MByte. The Map-Reduce engine 10 may include a Map-Reduce Java program 12, a resource manager 14, and node managers 16. Each of the node managers 16 may include at least one application master AM and a plurality of containers. The Map-Reduce engine 10 may give MR task, which is a program loaded on the Map-Reduce Java program 12, to the containers of the node managers 16 through the resource manager 14, and each container may read the block-based files from the HDFS 20 and process the corresponding MR task.

To be specific, the resource manager 14 may be provided in every cluster for managing the resources of the corresponding cluster and performing an operation of scheduling the MR tasks. When the resource manager 14 receives an application execution request ("Run Application") from a client at step S12, the resource manager 14 may execute the application master AM (start the application master AM) which will take in charge of executing the corresponding application at step S14. Also, the resource manager 14 may determine which resources are being used and which resources are allocated to each server through communication with all node managers 16 that are set up in the clusters. The resource manager 14 may also determine which resources are required by communicating with the application master AM.

The node managers 16 may monitor the percentage of used resources of the containers and inform the resource managers 14 of the related information. The application master AM may serve as a master server that manages one task which is executed in the YARN. The application master AM may allocate the MR tasks to corresponding containers under the control of the resource manager 14 at step S16. All jobs may be divided into a plurality of MR tasks, and each of the MR tasks may be processed in one container. Herein, since each container may be assigned with one processing device (e.g., a CPU), the number of all processing devices (e.g., CPUs) of the HADOOP clusters equals the number of all containers that are available in the HADOOP.

Meanwhile, at step S18, the containers may read the block-based files (e.g., approximately 128 MByte) from the HDFS 20 and process the MR tasks. Herein, for the Map-Reduce engine 10 to distribute the MR tasks into a plurality of servers and simultaneously process the jobs, forming one file block of an independent data set may be a basic condition for HADOOP distributed process.

In an embodiment of the present invention, big data outputted from a memory device may be stored in the HDFS 20, and when each of the containers reads the block-based files allocated to the HDFS 20, the files are divided on the basis of a particular memory command (e.g., a refresh command) so as to form an independent data set. Therefore, as the containers distributively process the data sets allocated thereto, the big data outputted from the memory device may be processed in parallel.

Hereafter, a data processing system capable of parallel processing big data that are outputted from a memory device based on a High-Availability Distributed Object-Oriented Platform (HADOOP) framework is described with reference to the accompanying drawings.

Figure 2:
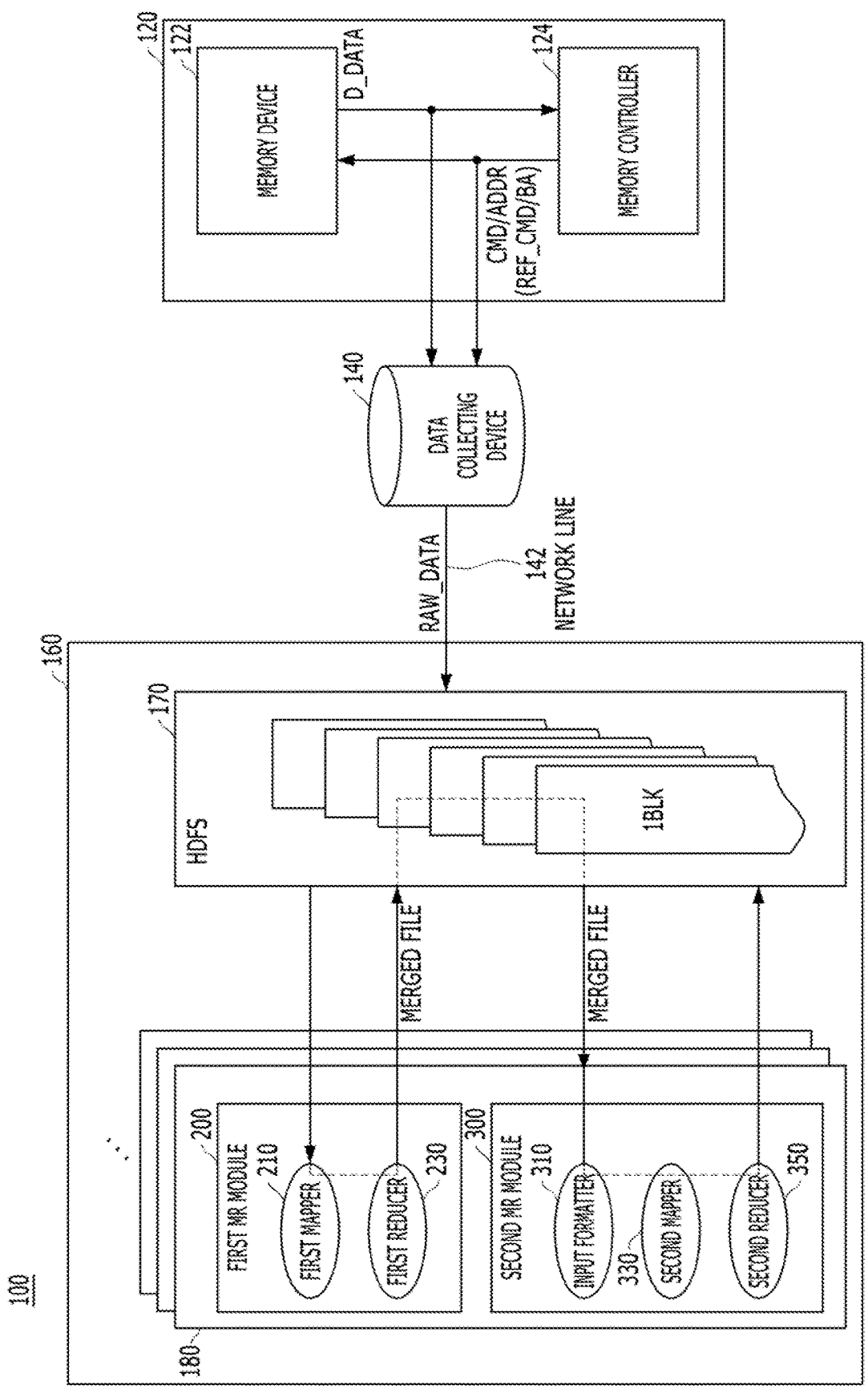
FIG. 2 is a block diagram illustrating a data processing system in accordance with an embodiment of the present invention.

FIG. 2 is a block diagram illustrating a data processing system 100 in accordance with an embodiment of the present invention.

Referring to FIG. 2, the data processing system 100 may include a memory system 120, a data collecting device 140, and a data processing device 160.

The memory system 120 may include a memory device 122 and a memory controller 124. The memory device 122 may be a Dynamic Random Access Memory (DRAM) device. The memory device 122 may perform operations corresponding to a command CMD and an address ADDR that are outputted from the memory controller 124 and may output DRAM data D_DATA.

The data collecting device 140 may be coupled to the memory device 122 and the memory controller 124 through a network. The data collecting device 140 may store data such as the command CMD, the address ADDR, and the DRAM data D_DATA, which are transferred between the memory device 122 and the memory controller 124 in real-time. The data collecting device 140 may collect big data RAW_DATA by integrating the stored data at a predetermined cycle or at every predetermined time, and may split the collected big data RAW_DATA on the basis of a predetermined unit. The data collecting device 140 may then transfer the big data RAW_DATA as split to the data processing device 160 by using a 10 Gigabit (Gb) network line 142. The data collecting device 140 may be a local file system.

The data processing device 160 may distributively store the big data RAW_DATA transferred from the data collecting device 140 in block-based files, divide the stored block-based files by a particular memory command, and process the divided block-based flies in parallel, based on the HADOOP framework. The data processing device 160 may transfer process result information to an administrator device (not shown). The administrator device may receive the process result information from the data processing device 160 and monitor the data processing device 160.

Herein, the particular memory command may be selected from commands capable of detecting whether the memory device 122 is in an operation state or an idle state. According to an embodiment of the present invention, the particular memory command may include a refresh command REF_CMD. In particular, the refresh command REF_CMD may include an all-bank refresh command that refreshes all banks of the memory device 122 and a per-bank refresh command that refreshes an individual bank of the memory device 122. When the particular memory command is the per-bank refresh command, a target bank address BA corresponding to the individual bank to be refreshed may be additionally included in order to detect whether the individual bank is in an operation state or an idle state. Therefore, in the embodiment of the present invention, the data processing system 100 may be secured with data integrity by dividing the stored big data RAW_DATA based on the refresh command REF_CMD.

The data processing device 160 may divide the stored block-based files into data sets of a preset unit by parsing the refresh command REF_CMD on a clock basis, analyze the data sets by using a command counter algorithm, an illegal check algorithm, an asynchronous (AC) analysis algorithm, a power analysis algorithm, and a smart search algorithm, and summarize and output the analysis results. Particularly, the data processing device 160 may search for the refresh command REF_CMD from an initial position of the stored block-based files, put a clock-based parser at every position where the refresh command is searched, and divide the block-based files into the data sets based on the parser positions.

The data processing device 160 may include a HADOOP distributed file system (HDFS) 170 serving as a distributed storage of large-capacity data, and a plurality of Map-Reducers 180 serving as a distributed processing of the large-capacity data.

The HDFS 170 may divide the big data RAW_DATA transferred from the data collecting device 140 into the block-based files of a predetermined size, e.g., 128 Mbytes, and store the block-based files. The Map-Reducers 180 may divide the data stored in the block-based files of the HDFS 170 into the data sets by parsing the data with the particular memory command, and process the data sets in parallel based on a Map-Reduce scheme.

Herein, the Map-Reducers 180 shown in FIG. 2 may correspond to the containers included in the node manager (16 of FIG. 1) of the Map-Reduce engine (10 of FIG. 1). In other words, the Map-Reducers 180 shown in FIG. 2 may be provided to respectively correspond to the containers, and each of the Map-Reducers 180 may be disposed in a corresponding container and may process the MR task assigned by the resource manager (14 of FIG. 1) and the node manager 16 by reading out a corresponding block-based file stored in the HDFS 20. Hereafter, to focus on the description of the point of the present invention, description on the Map-Reduce Java program 12, the resource manager 14, and the node manager 16 are omitted herein.

Each of the Map-Reducers 180 may include a first Map-Reducer (MR) module 200 and a second MR module 300. The first MR module 200 may include a first mapper 210 and a first reducer 230. The second MR module 300 may include an input formatter 310, a second mapper 330, and a second reducer 350.

The first MR module 200 may index the data stored in the block-based files of the HDFS 170 by a small unit (e.g., 1 Mbyte unit), distributively process the indexed data based on the Map-Reduce scheme, and output a merged file. The first MR module 200 may store the merged file back into the HDFS 170. The second MR module 300 may divide the merged file into the data sets of the preset unit by parsing the merged file stored in the HDFS 170 by a particular memory command, analyze the data sets, and summarize and output the analysis results.

According to an embodiment of the present invention, a merged file is generated by indexing the big data RAW_DATA stored in the HDFS 170 into small unit files and by rearranging the files first, and then second by, the merged file is divided into independent data sets by parsing the merged file with a predetermined memory command. Then, the MR modules distributively process the independent data sets. In this way, the big data outputted from the memory device may be distributively processed in parallel.

Hereafter, the structure and operation of the data processing device 160 is described in further detail with reference to FIGS. 2 and 3.

Figure 3:
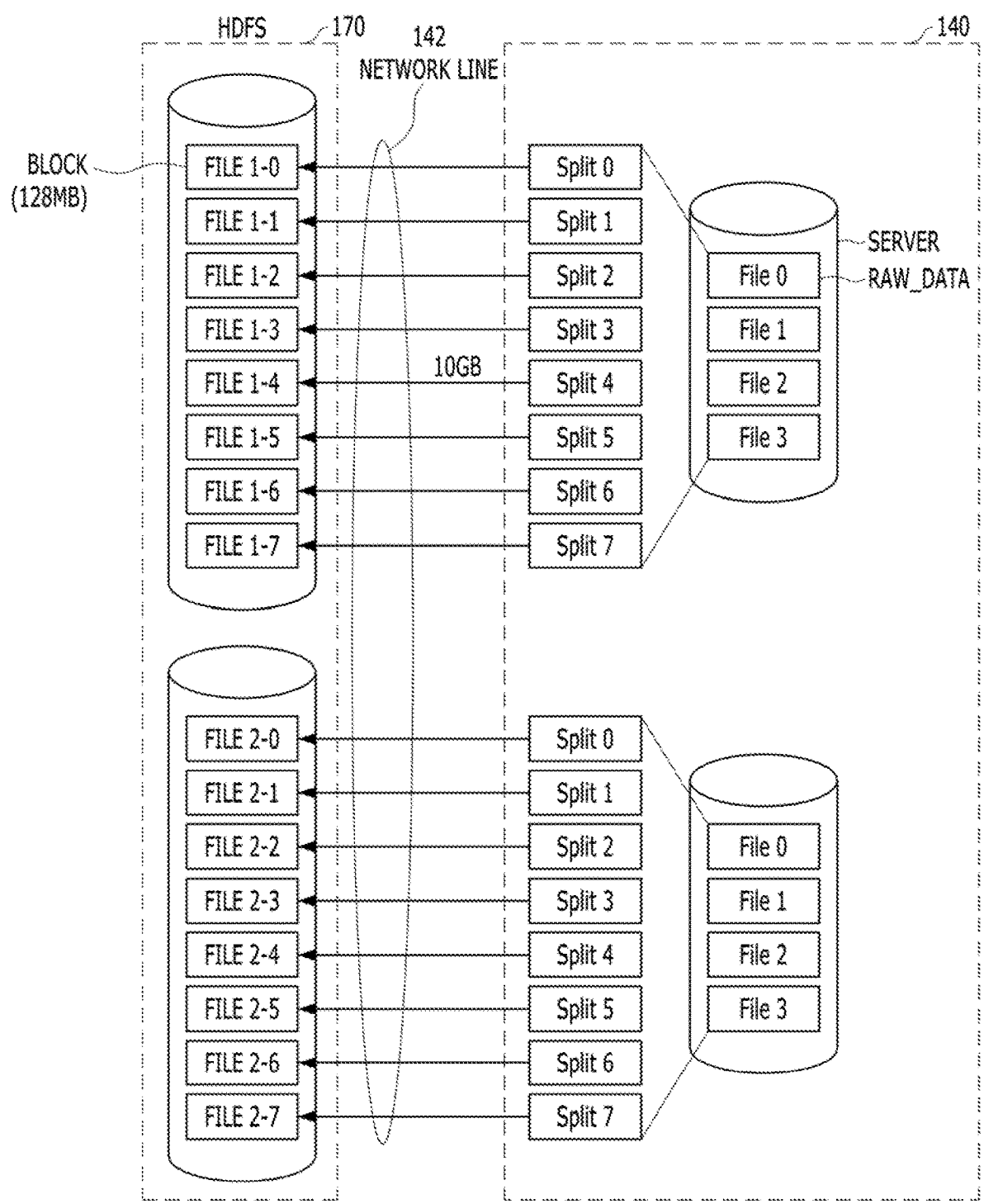
FIG. 3 is a diagram illustrating an operation of a HADOOP distributed file system (HDFS) of FIG. 2.

FIG. 3 is a diagram illustrating an operation of the HADOOP distributed file system (HDFS) 170 of the data processing device 160 shown in FIG. 2.

Referring to FIG. 3, the servers of the data collecting device 140 may collect big data RAW_DATA by capturing the data transferred between the memory device (refer to '122' of FIG. 2) and the memory controller (refer to '124' of FIG. 2) in real-time and integrating the captured data at a predetermined cycle or at every predetermined time. Also, the data collecting device 140 may transfer the collected big data RAW_DATA by splitting the collected big data RAW_DATA into a plurality of predetermined units to increase the transfer rate (i.e., bandwidth). Herein, after the data collecting device 140 splits the collected big data RAW_DATA, the data collecting device 140 may transfer the split big data RAW_DATA to the data processing device 160 by using a 10 Gb network line 142. The HDFS 170 may divide the split big data RAW_DATA that are transferred from the data collecting device 140 in block-based files of a predetermined size (e.g., 128 Mbytes) and store the block-based files.

Figure 4:
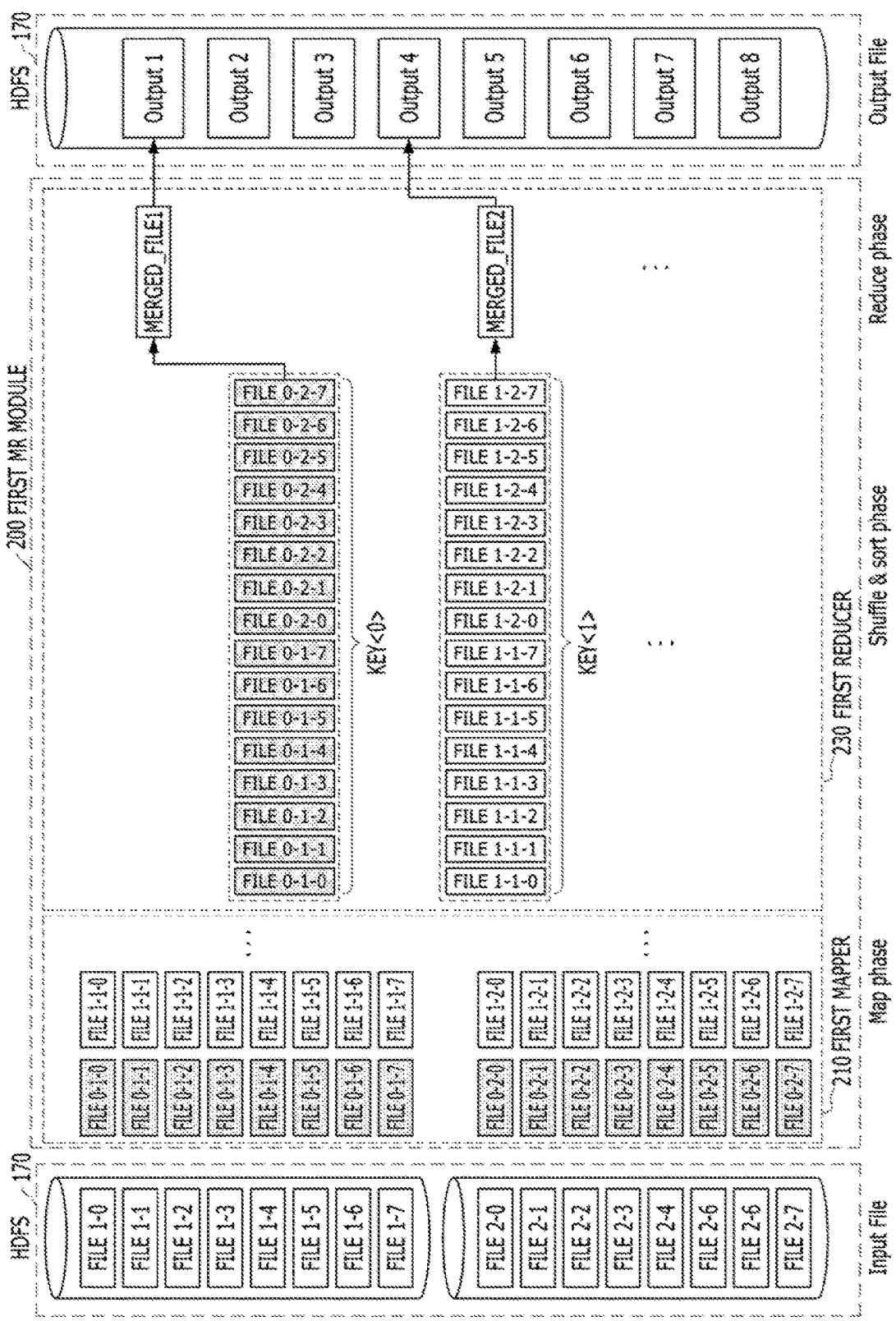
FIG. 4 is a diagram illustrating an operation of a first Map-Reducer (MR) module of FIG. 2.
Figure 5:
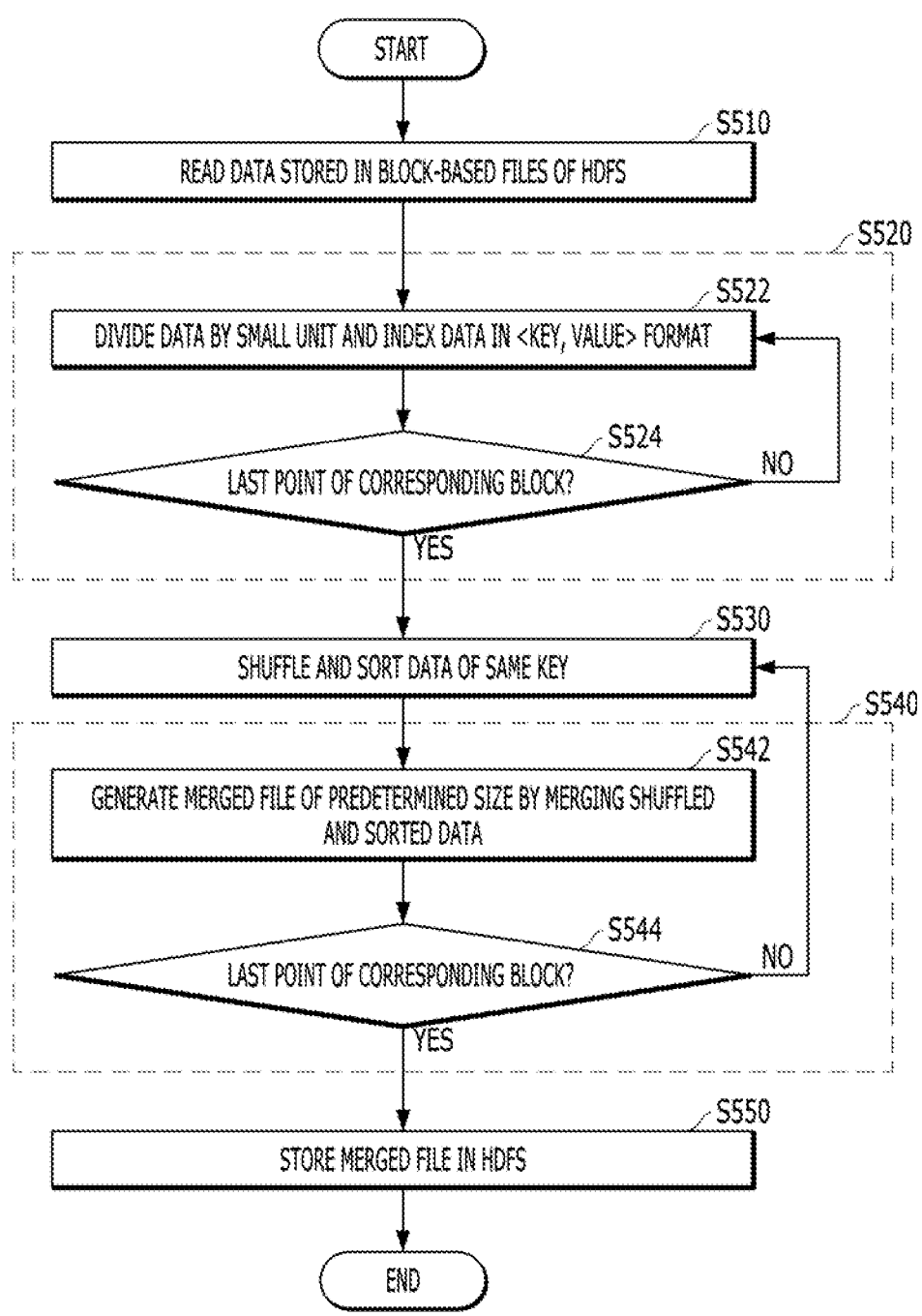
FIG. 5 is a flowchart describing an operation of the first MR module shown in FIG. 4.

FIG. 4 is a diagram illustrating an operation of the first MR module 200 of FIG. 2. FIG. 5 is a flowchart describing an operation of the first MR module 200 shown in FIG. 4.

Referring to FIG. 4, the first MR module 200 may include the first mapper 210 and the first reducer 230.

The first mapper 210 may perform a mapping operation of dividing the data stored in the block-based files of the predetermined size (e.g., 128 Mbytes) into data of a small unit (e.g., 1 MByte) and indexing the data of the small unit in a <KEY, VALUE> format. To be specific, the small unit-based data may be indexed in the form of <KEY, FILE SEQUENCE> or <SERVER SEQUENCE, DATA>. For example, the first mapper 210 may generate the small unit files FILE 0-1-0, FILE 1-1-0, . . . by dividing the data stored in a block-based file FILE 1-0 of the HDFS 170, and generate the small unit files FILE 0-2-0, FILE 1-2-0, . . . by dividing the data stored in a block-based file FILE 2-0 of the HDFS 170. Herein, in a small unit file FILE X-Y-Z, 'X' may represent a key, and 'Y' may represent a file sequence, and 'Z' may represent a server sequence. The first mapper 210 may transfer the small unit files indexed in the form of <KEY, VALUE> to the first reducer 230.

The first reducer 230 may receive the small unit files indexed in the form of <KEY, VALUE> from the first mapper 210 and shuffle and sort data having the same key value. For example, since the small unit files FILE 0-1-0, FILE 0-1-1, FILE 0-1-2, FILE 0-1-3, FILE 0-1-4, FILE 0-1-5, FILE 0-1-6, FILE 0-1-7, FILE 0-2-0, FILE 0-2-1, FILE 0-2-2, FILE 0-2-3, FILE 0-2-4, FILE 0-2-5, FILE 0-2-6, and FILE 0-2-7 have the same key value, i.e., a key KEY<0>, the first reducer 230 may shuffle and sort the small unit files FILE 0-1-0, FILE 0-1-1, FILE 0-1-2, FILE 0-1-3, FILE 0-1-4, FILE 0-1-5, FILE 0-1-6, FILE 0-1-7, FILE 0-2-0, FILE 0-2-1, FILE 0-2-2, FILE 0-2-3, FILE 0-2-4, FILE 0-2-5, FILE 0-2-6, and FILE 0-2-7. Also, the small unit files FILE 1-1-0, FILE 1-1-1, FILE 1-1-2, FILE 1-1-3, FILE 1-1-4, FILE 1-1-5, FILE 1-1-6, FILE 1-1-7, FILE 1-2-0, FILE 1-2-1, FILE 1-2-2, FILE 1-2-3, FILE 1-2-4, FILE 1-2-5, FILE 1-2-6, and FILE 1-2-7 have the same key value, i.e., a key KEY<1>, the first reducer 230 may shuffle and sort the small unit files FILE 1-1-0, FILE 1-1-1, FILE 1-1-2, FILE 1-1-3, FILE 1-1-4, FILE 1-1-5, FILE 1-1-6, FILE 1-1-7, FILE 1-2-0, FILE 1-2-1, FILE 1-2-2, FILE 1-2-3, FILE 1-2-4, FILE 1-2-5, FILE 1-2-6, and FILE 1-2-7.

Subsequently, the first reducer 230 may perform a reducing operation for merging the shuffled and sorted files and generating merged files MERGED_FILE1, MERGED_FILE2, . . . of a predetermined size. The first reducer 230 may store the generated merged files MERGED_FILE1, MERGED_FILE2, . . . back into the HDFS 170. Although it is described in the embodiment of the present invention that the small unit files indexed in the form of <KEY, VALUE> from the first mapper 210 are shuffled and sorted by the first reducer 230, the operations of shuffling and sorting may be performed separately from the first mapper 210 and the first reducer 230.

To sum up, the operation of the first MR module 200 is performed as follows.

Referring to FIG. 5, in step S510, the first mapper 210 may read the data stored in a corresponding block-based file among the block-based files of the HDFS 170.

In step S520, the first mapper 210 may perform a mapping operation. In other words, the first mapper 210 may divide the data stored in the corresponding block-based file into data of a small unit (e.g., 1 MByte) and index them in the form of <KEY, VALUE> in step S522. In step S524, the first mapper 210 may perform the mapping operation until the end point of the corresponding block.

In step S530, the first reducer 230 may receive the small unit files indexed in the form of <KEY, VALUE> from the first mapper 210 and shuffle and sort the data having the same key value.

In step S540, the first reducer 230 may perform a reducing operation. In other words, the first reducer 230 may generate merged files by merging the shuffled and sorted files in step S542.

In step S544, the first reducer 230 may perform the mapping operation until the end point of the corresponding block.

In step S550, the first reducer 230 may store the generated merged file in the HDFS 170 again.

Figure 6:
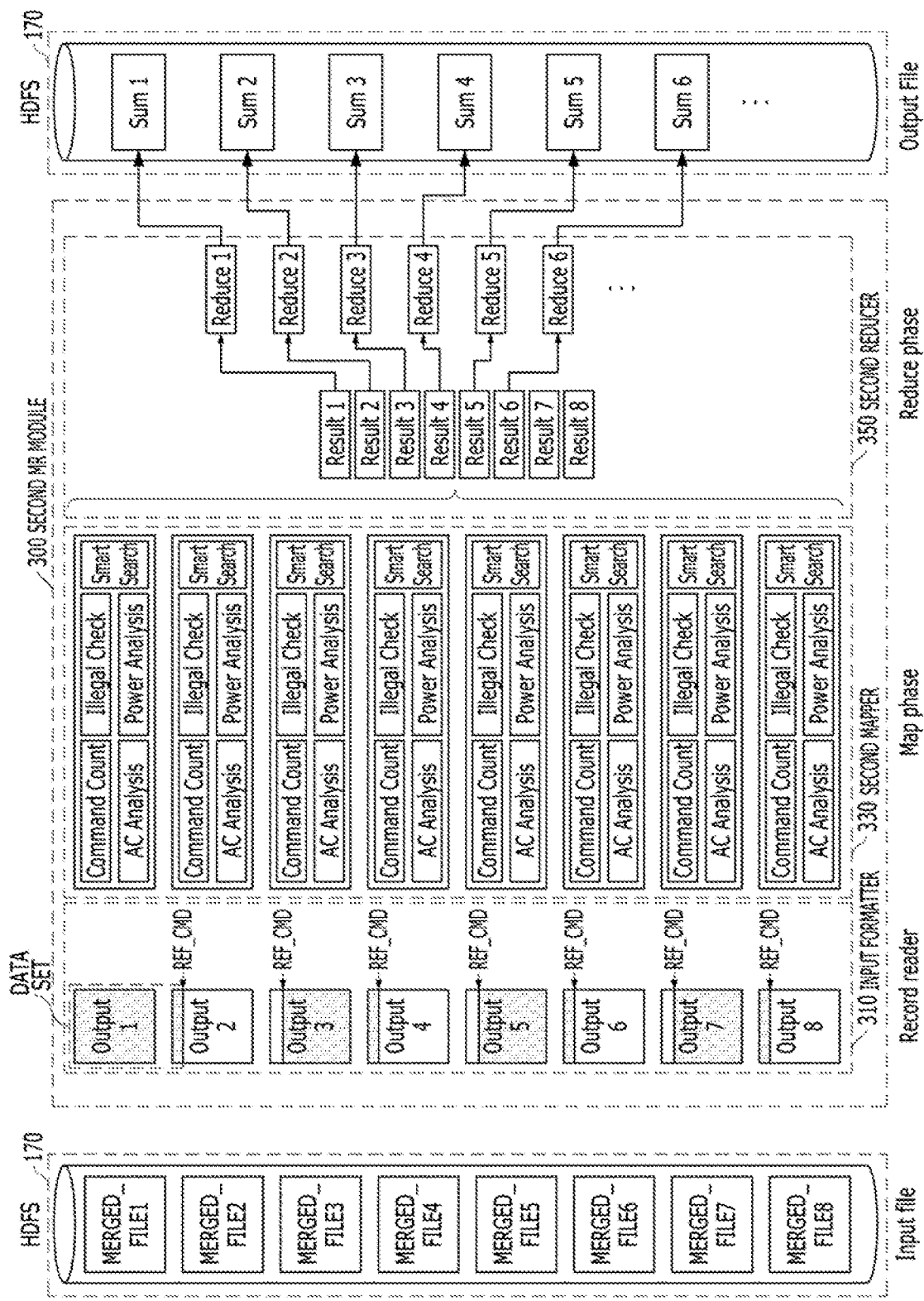
FIG. 6 is a diagram illustrating an operation of a second MR module shown in FIG. 2.
Figure 7:
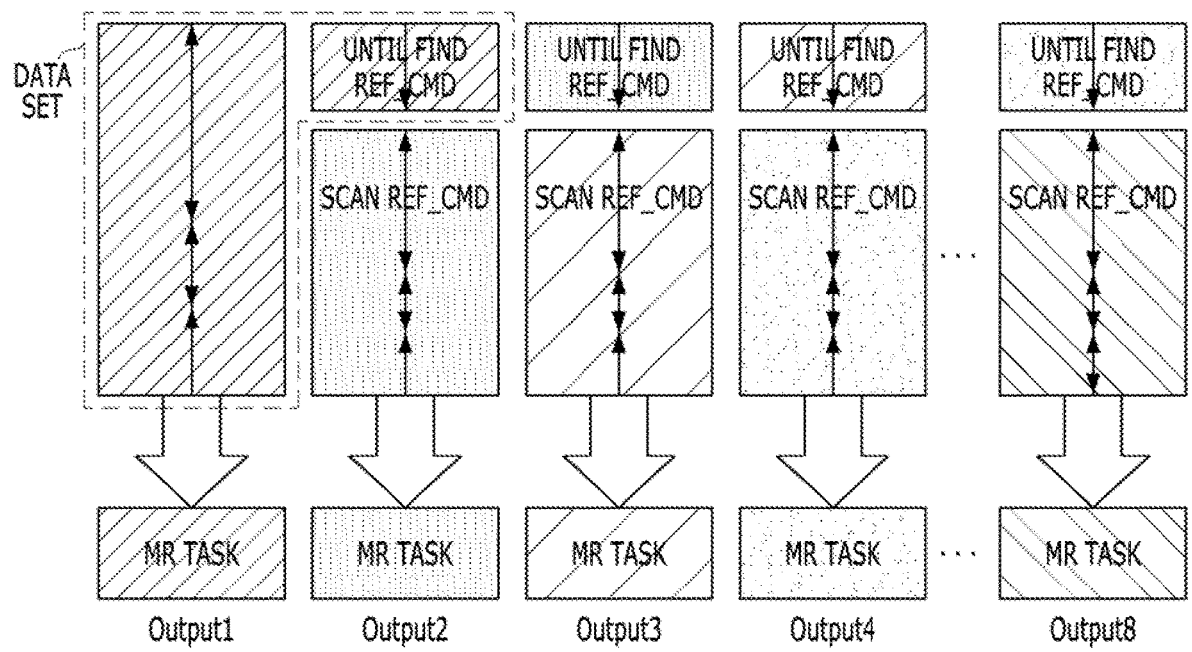
FIG. 7 is a diagram illustrating an operation of an input formatter shown in FIG. 6.
Figure 8:
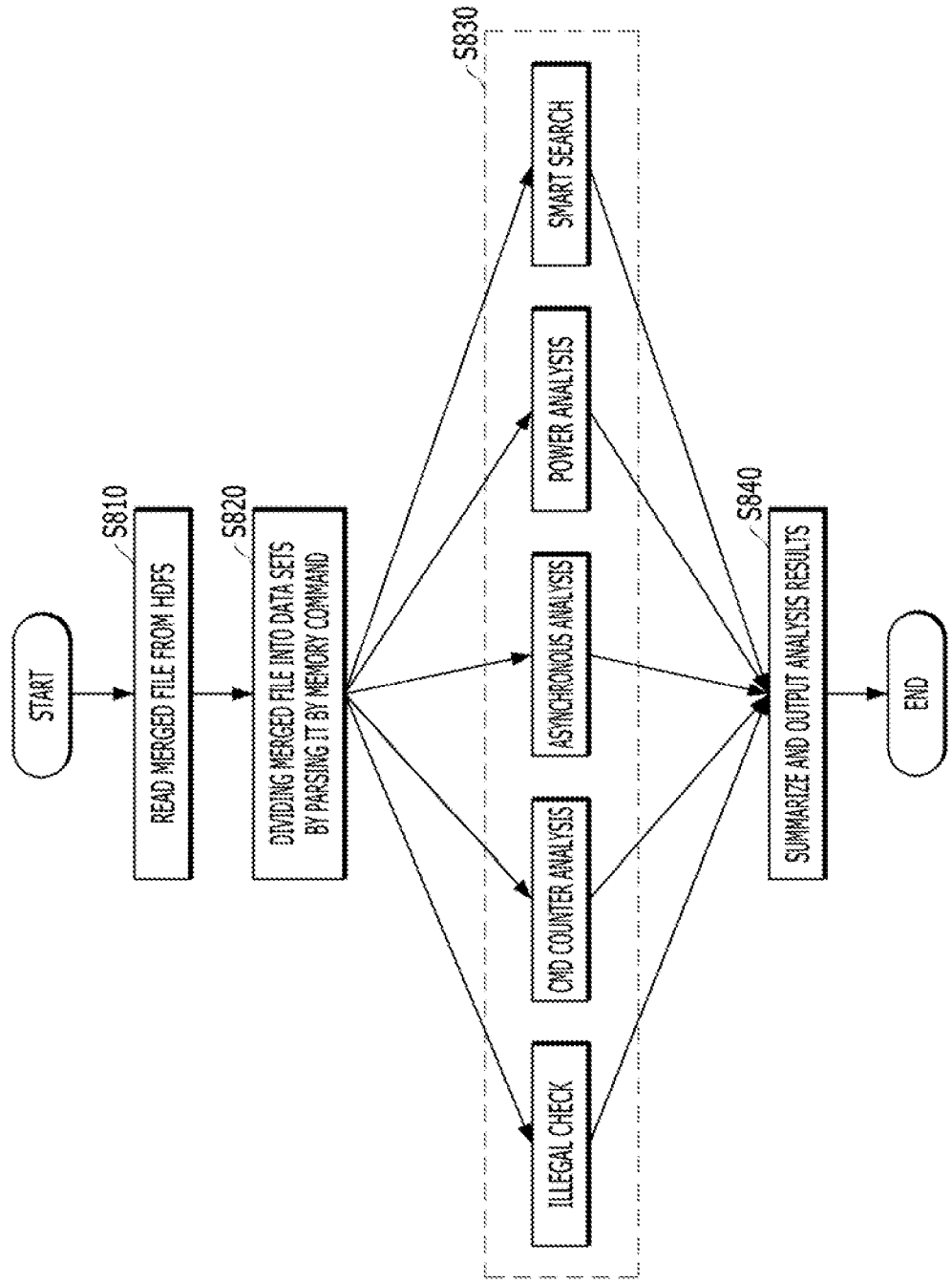
FIG. 8 is a flowchart describing an operation of the second MR module shown in FIG. 6.

FIG. 6 is a diagram illustrating an operation of the second MR module 300 shown in FIG. 2. FIG. 7 is a diagram illustrating an operation of the input formatter 310 shown in FIG. 6. FIG. 8 is a flowchart describing an operation of the second MR module 300 shown in FIG. 6.

Referring to FIG. 6, the second MR module 300 may include the input formatter 310, the second mapper 330, and the second reducer 350.

The input formatter 310 may divide merged files MERGED_FILE1 to MERGED_FILE8 stored in the HDFS 170 into data sets by parsing the merged files MERGED_FILE1 to MERGED_FILE8 by a particular memory command. For example, referring to FIG. 7, the input formatter 310 may search for the refresh command REF_CMD from an initial position of the merged files MERGED_FILE1 to MERGED_FILE8, put a clock-based parser at every position where the refresh command REF_CMD is detected, and divide the merged files MERGED_FILE1 to MERGED_FILE8 into the data sets based on the parser positions. In FIG. 7, the data of the same pattern may form one data set. Therefore, the input formatter 310 may divide the merged files MERGED_FILE1 to MERGED_FILE8 stored in the HDFS 170 into independent data sets Output1 to Output8. Each of the independent data sets Output1 to Output8 may be processed as an MR task.

The second mapper 330 may analyze a corresponding data set DATA_SET based on a command counter algorithm, an illegal check algorithm, an asynchronous analysis algorithm, a power analysis algorithm, and a smart search algorithm. Herein, the command counter algorithm may be an algorithm for analyzing entire command count information by parsing memory commands that are defined in the Joint Electron Devices Engineering Council (JEDEC) to find out a ratio of the memory commands among the commands CMD of the DRAM data D_DATA. The illegal check algorithm may be an algorithm for examining the integrity of the collected big data RAW_DATA and sensing malfunction of the memory controller (refer to '124' of FIG. 2). The illegal check algorithm may examine a memory state machine and analyze the big data RAW_DATA by an illegal clock position and an illegal type. The asynchronous analysis algorithm may be an algorithm for analyzing command distribution and the minimum value of the timing between the commands CMD that are set by the memory controller 124 by examining an asynchronous timing parameter. The power analysis algorithm may be an algorithm for counting the idle states by sensing the idle states of the memory device (refer to '122' of FIG. 2), and analyzing the workload in a particular section by calculating the amount of power consumption corresponding thereto. The smart search algorithm may be an algorithm for performing analysis by flexibly setting up target search conditions with a combination of a memory command and a clock.

The second reducer 350 may summarize the analysis results Result1 to Result8 of the second mapper 330 and output a summarized result. The second reducer 350 may store the outputted summarized files Reduce1 to Reduce8 in the HDFS 170.

The operation of the second MR module 300 may be summarized as follows.

Referring to FIG. 8, in step S810, the input formatter 310 may read the merged files MERGED_FILE1 to MERGED_FILE8 stored in the HDFS 170.

In step S820, the input formatter 310 may divide the merged files MERGED_FILE1 to MERGED_FILE8 stored in the HDFS 170 into independent data sets by parsing the merged files MERGED_FILE1 to MERGED_FILE8 by a memory command (e.g. the refresh command REF_CMD).

In step S830, the second mapper 330 may analyze the corresponding data set DATA_SET by using a command counter algorithm, an illegal check algorithm, an asynchronous analysis algorithm, a power analysis algorithm, and a smart search algorithm.

Lastly, in step S840, the second reducer 350 may summarize the analysis results RESULT1 to RESULT8 of the second mapper 330 and output the summarized result.

Figure 9:
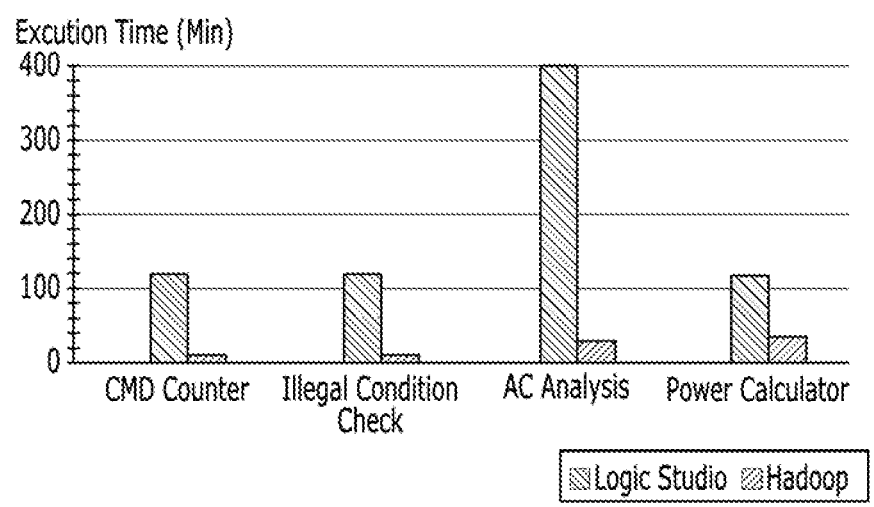
FIG. 9 is a graph showing improvement in a data processing performance according to an embodiment of the present invention and a comparative example.

FIG. 9 is a graph showing improvement in a DRAM data processing performance according to an embodiment of the present invention and a comparative example. The graph of FIG. 9 compares a time taken for analyzing 1 TB of DRAM data that are collected by applying a HADOOP framework in accordance with the embodiment of the present invention with a time taken for analyzing 1 TB of DRAM data that are collected by applying Logic Studio, which is an existing DRAM analysis software tool.

Herein, a server used for an experiment for calculating the processing times according to the embodiment of the present invention and the comparative example may include three name nodes (which correspond to the resource manager 14 of FIG. 1) and five worker nodes (which correspond to the node manager 16 of FIG. 1). One worker node may be able to simultaneously execute a mapper or a reducer through 32 processing units (e.g., CPUs). In short, a total of 160 MR tasks may be simultaneously processed in the HADOOP environment.

Referring to FIG. 9, in case of the asynchronous analysis algorithm, whereas the data processing time of the existing Logic Studio tool is approximately 400 minutes, the data processing time of the HADOOP framework according to the embodiment of the present invention is approximately 30 minutes, which is improved to be approximately 13 times faster. Likewise, in case of the command counter algorithm and the illegal check algorithm, the data processing time of the HADOOP framework according to the embodiment of the present invention is improved to be approximately 12 times faster. In case of the power analysis algorithm, the data processing time of the HADOOP framework according to the embodiment of the present invention is improved to be approximately 3.5 times faster.

As described above, in the embodiment of the present invention, large-capacity data outputted from the memory device may be processed based on the HADOOP framework by first generating merged files by dividing the big data RAW_DATA stored in the HDFS into small unit files and indexing and rearranging the small unit files, and second by dividing the generated merged files into independent data sets by parsing the merged files based on a particular memory command, and distributively processing the data sets in the MR modules. In this way, it is possible to search a memory operation pattern desired by engineers from the large-capacity data outputted from the memory device. Also, the data processing system in accordance with the embodiment of the present invention may be able to reduce the data analysis time by parallel processing the large-capacity data outputted from the memory device based on the HADOOP framework.

According to an embodiment of the present invention, the data processing system is capable of parallel processing large-capacity data that are outputted from a memory device based on a High-Availability Distributed Object-Oriented Platform (HADOOP) framework, and a data processing method thereof. With the data processing system, it is possible to figure out a memory operation pattern, which is desired by engineers, from large-capacity data that are outputted from a memory device.

Also, the data processing system according to the embodiment of the present invention may be able to decrease the time taken for analyzing large-capacity data by parallel processing large-capacity data that are outputted from the memory device based on the HADOOP framework.

While the present invention has been described with respect to specific embodiments, it will be apparent to those skilled in the art that various changes and modifications may be made without departing from the spirit and scope of the invention as defined in the following claims.

What is claimed is:

1. A data processing system comprising:
   a memory device configured to perform an operation corresponding to a command transferred from a memory controller, and output a memory data;
   a data collecting device configured to collect big data by capturing the command and the memory data transferred between the memory device and the memory controller in real time and combining/integrating captured data at a predetermined time period or at every predetermined time, split the collected big data based on a predetermined unit, and transfer the split big data; and
   a data processing device configured to store the split big data received from the data collecting device in block-based files in a High-Availability Distributed Object-Oriented Platform (HADOOP) distributed file system (HDFS), classify the block-based files based on a particular memory command, and process the block-based files.

2. The data processing system of claim 1, wherein the particular memory command is selected from commands capable of detecting whether a memory device is in an operation state or in an idle state.

3. The data processing system of claim 1, wherein the particular memory command includes a refresh command.

4. The data processing system of claim 3, wherein the particular memory command includes an all-bank refresh command for refreshing all banks.

5. The data processing system of claim 3, wherein the particular memory command includes a per-bank refresh command for refreshing an individual bank among banks and a target bank address corresponding to the individual bank to be refreshed.

6. The data processing system of claim 3, wherein the data processing device divides the stored block-based files into data sets of a preset unit by parsing the refresh command by a clock unit, analyzes the data sets by using a command counter algorithm, an illegal check algorithm, an asynchronous analysis algorithm, a power analysis algorithm, and a smart search algorithm, and summarizes analysis results to output a summarized result.

7. The data processing system of claim 6, wherein the data processing device searches for the refresh command from an initial position of the stored block-based files, puts a clock-based parser at every position where the refresh command is searched, and divides the block-based files into the data sets based on positions where the clock-based parser is put.

8. The data processing system of claim 1, wherein the data processing device includes:
   the HDFS configured to divide the split big data into the block-based files of a predetermined size, and store the block-based files; and a Map-Reducer configured to divide data stored in the block-based files of the HDFS into data sets of a preset unit by parsing the data by the particular memory command, and process the data sets in parallel based on a Map-Reduce scheme.

9. The data processing system of claim 8, wherein the Map-Reducer includes:
 a first Map-Reducer (MR) module configured to index the data stored in the block-based files of the HDFS by a small unit, distributively process the indexed data based on the Map-Reduce scheme, and output a merged file; and
 a second MR module configured to divide the merged file into data sets of the preset unit by parsing the merged file by the particular memory command, analyze the data sets, and summarize analysis results to output a summarized result.

10. The data processing system of claim 9, wherein the first MR module includes:
 a first mapper configured to perform a mapping operation of dividing the data stored in the block-based files of the HDFS into data of the small unit, and index the data of the small unit in a form of <KEY, VALUE>; and
 a first reducer configured to receive indexed data from the first mapper, shuffle and sort the indexed data of the same key value, and perform a reducing operation of generating the merged file by merging the shuffled and sorted data.

11. The data processing system of claim 9, wherein the second MR module includes:
 an input formatter configured to divide the merged file into the data sets by parsing the merged file by the particular memory command;
 a second mapper configured to analyze the data sets by using a command counter algorithm, an illegal check algorithm, an asynchronous (AC) analysis algorithm, a power analysis algorithm, and a smart search algorithm; and
 a second reducer configured to summarize analysis results of the second mapper to output the summarized result.

12. The data processing system of claim 11, wherein the input formatter searches for a refresh command from an initial position of the merged file, puts a clock-based parser at every position where the particular memory command is searched, and divides the merged file into the data sets based on positions where the clock-based parser is put.

13. A data processing method comprising:
 outputting a memory data by a memory device by performing an operation corresponding to a command transferred from a memory controller;
 collecting big data by capturing the command and the memory data transferred between the memory device and the memory controller in real time and combining/integrating captured data at a predetermined time period or at every predetermined time, and transferring the collected big data by splitting the collected big data into a predetermined unit; and
 storing the big data in block-based files in a High-Availability Distributed Object-Oriented Platform (HADOOP) distributed file system (HDFS), dividing the stored block-based files by a particular memory command, and processing the divided block-based files.

14. The data processing method of claim 13, wherein the particular memory command includes a refresh command.

15. The data processing method of claim 14, wherein the particular memory command includes an all-bank refresh command for refreshing all banks.

16. The data processing method of claim 14, wherein the particular memory command includes a per-bank refresh command for refreshing an individual bank among banks and a target bank address corresponding to the individual bank to be refreshed.

17. The data processing method of claim 13, wherein the storing of the big data in the block-based files in the HDFS, the dividing of the stored block-based files by the particular memory command, and the processing of the divided block-based files includes:
 dividing the big data into the block-based files of a predetermined size and storing the block-based files in the HDFS;
 indexing data stored in the block-based files of the HDFS by a small unit, distributively processing the indexed data based on a Map-Reduce scheme, and outputting a merged file; and
 dividing the merged file into data sets of a preset unit by parsing the merged file by the particular memory command, analyzing the data sets, and summarizing analysis results to output a summarized result.

18. The data processing method of claim 17, wherein the outputting of the merged file includes:
 performing a mapping operation of dividing the data stored in the block-based files of the HDFS into data of the small unit and indexing the data of the small unit in a form of <KEY, VALUE>;
 receiving the indexed data, and shuffling and sorting data of the same key value; and
 performing a reducing operation of generating the merged file by merging the shuffled and sorted data.

19. The data processing method of claim 17, wherein the summarizing of the analysis results to output the summarized result includes:
 dividing the merged file into the data sets by parsing the merged file by the particular memory command;
 analyzing the data sets by using a command counter algorithm, an illegal check algorithm, an asynchronous (AC) analysis algorithm, a power analysis algorithm, and a smart search algorithm; and
 summarizing the analysis results to output the summarized result.

20. The data processing method of claim 19, wherein the dividing of the merged file into the data sets includes:
 searching for a refresh command from an initial position of the merged file; and
 putting a clock-based parser at every position where the refresh command is searched, and dividing the merged file into the data sets based on positions where the clock-based parser is put.

21. A data processing system comprising:
 a memory device configured to perform an operation corresponding to a command transferred from a memory controller, and output a memory data;
 a data collecting device configured to collect big data by capturing the command and the memory data transferred between the memory device and the memory controller in real time and combining/integrating captured data at a predetermined time period or at every predetermined time, and transfer the collected big data by splitting the collected big data into a predetermined unit; and
 a data processing device configured to distributively store the big data transferred from the data collecting device in block-based files, divide the stored block-based files by a particular memory command, and parallel process the divided block-based files.

22. The data processing system of claim 21, wherein the data processing device divides the stored block-based files into data sets of a preset unit by parsing a refresh command.

23. The data processing system of claim 22, wherein the data processing device searches for the refresh command from an initial position of the stored block-based files, puts a clock-based parser at every position where the refresh command is searched, and divides the block-based files into the data sets based on positions where the clock-based parser is put.

24. The data processing system of claim 22, wherein the data processing device analyzes the data sets by using a command counter algorithm, an illegal check algorithm, an asynchronous analysis algorithm, a power analysis algorithm, and a smart search algorithm, and summarizes analysis results to output a summarized result.

* * * * *